United States Patent Office 3,124,568
Patented Mar. 10, 1964

3,124,568
AZO-DYESTUFFS
Rudolf Mory, Dornach, Hansrolf Loeffel, Neuallschwil, and Karl Ronco, Muttenz, Switzerland, assignors to Ciba Limited, Basel, Switzerland, a company of Switzerland
No Drawing. Filed Jan. 12, 1962, Ser. No. 165,933
Claims priority, application Switzerland Jan. 13, 1961
6 Claims. (Cl. 260—203)

This invention provides valuable new azo-dyestuffs which are free from groups imparting solubility in water, especially sulfonic acid, carboxylic acid and sulfonamide groups, and correspond to the general formula (1)
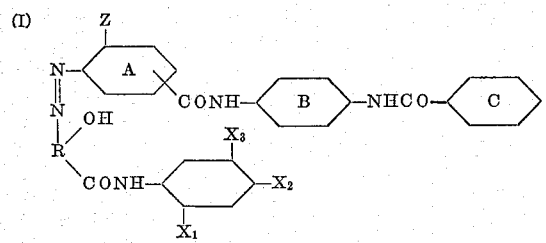

in which R represents a naphthalene radical in which the azo, hydroxyl and carboxylic acid amide groups are in the 1-, 2- and 3-positions, respectively, $X_1$, $X_2$ and $X_3$ represent hydrogen or halogen atoms or alkyl or alkoxy groups, and Z represents a halogen atom or an alkyl, alkoxy or phenoxy group, and in which the benzene radicals A, B and C may contain further substituents not imparting solubility in water, and the —CONH— group in the ring A is in meta- or para-position to the azo group.

The invention also provides a process for the manufacture of the above dyestuffs, wherein an azo-dyestuff carboxylic acid halide of the formula (2)
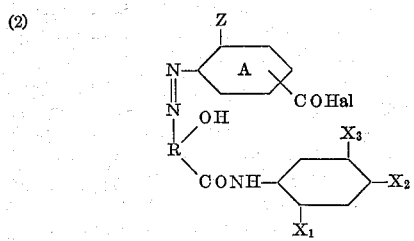

in which R, $X_1$, $X_2$, $X_3$ and Z have the meanings given above, and the carboxylic acid halide group in ring A is in meta- or para-position to the azo group, is condensed with an amine of the formula (3)
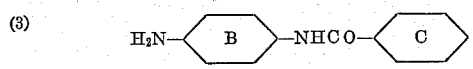

The azo-dyestuff carboxylic acids, from which the acid halides of the Formula 2 are prepared, are obtained by coupling a diazotized amino-benzene carboxylic acid of the formula (4)
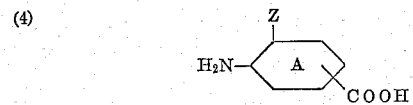

in which Z has the meaning given above, and the carboxylic acid group is in meta- or para-position to the amino group, is coupled with a β-hydroxynaphthoic acid anilide of the formula (5)
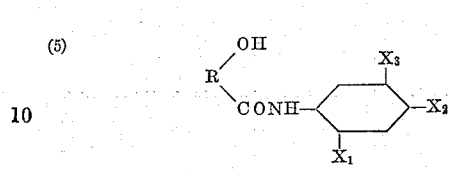

in which R, $X_1$, $X_2$ and $X_3$ have the meanings given above.
In the azo-benzene carboxylic acids of the Formula 4, Z advantageously represents an alkoxy group, for example, a methoxy group, or a phenoxy group. As examples of such carboxylic acids there may be mentioned:

3-amino-4-methoxybenzene carboxylic acid,
3-amino-4-phenoxybenzene carboxylic acid,
3-amino-4-p-chlorophenoxybenzene carboxylic acid,
3-amino-4-methylbenzene carboxylic acid,
3-amino-4-chlorobenzene carboxylic acid,
3-amino-4-fluorobenzene carboxylic acid,
4-amino-3-nitrobenzene carboxylic acid and
4-amino-3-methylbenzene carboxylic acid.

The 2:3-hydroxynaphthoic acid anilides used as coupling components may be substituted in the benzene ring not containing the carboxylic acid arylide group, for example, by a halogen atom, especially a bromine atom in the 6-position, or an alkoxy or alkyl group. However, there is preferably used the unsubstituted 2:3-hydroxynaphthoic acid anilide.

The azo-carboxylic acids so obtained are treated with an agent capable of converting carboxylic acids into their halides, for example, into their chlorides or bromides. Such agents are especially phosphorus halides, such as phosphorus pentabromide or phosphorus trichloride or pentachloride, phosphorus oxyhalides and advantageously thionyl chloride.

The treatment with such acid-halogenating acids, is advantageously carried out in an inert organic solvent, such as dimethyl-formamide, chlorobenzenes, for example, mono- or di-chlorobenzene, toluene, xylene or nitrobenzene, the five last-mentioned solvents being used, if desired, with the addition of a small amount of dimethylformamide or pyridine.

In preparing the carboxylic acid halides it is generally of advantage first to dry the azo-carboxylic acids, since they have been prepared in an aqueous medium, or to free them from water by azeotropic boiling in an organic solvent. This azeotropic drying may be carried out immediately before the treatment with the acid-halogenating agent.

In the process of the invention, the mono-carboxylic acid halides so obtained are condensed with amines of the formula (3)
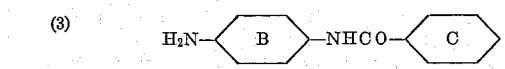

advantageously in the molar ratio 1:1.

The benzene radicals B and C may contain substituents, for example, halogen atoms, or lower alkyl or alkoxy groups. As examples of amines of the Formula 3 there may be mentioned:

1-amino-4-benzoylaminobenzene,
1-amino-4-(para-chlorobenzoylamino)-benzene,
1-amino-2-methoxy-5-methyl-4-benzoylaminobenzene,
1-amino-2:5-dimethoxy-4-benzoylaminobenzene,
1-amino-2:5-dichloro-4-benzoylaminobenzene,
1-amino-2-methoxy-5-chloro-4-benzoylaminobenzene,
1-amino-2-chloro-5-methoxy-4-benzoylaminobenzene,
1-amino-2:5-dimethyl-4-benzoylaminobenzene,
1-amino-2:5-dimethyl-4-(para-chlorobenzoyl)-aminobenzene and
1-amino-2:5-dichloro-4-(para-chlorobenzoyl)-aminobenzene.

The condensation of the carboxylic acid halides with the amines is advantageously carried out in an anhydrous medium. Under these conditions the condensation generally takes place surprisingly easily even at temperatures within the boiling range of normal organic solvents, such as toluene, monochlorobenzene, dichlorobenzene, trichlorobenzene, nitrobenzene or the like. In order to accelerate the reaction it is generally of advantage to use an agent capable of binding acid, such as anhydrous sodium acetate or pyridine. Some of the dye stuffs so obtained are crystalline and others are amorphous, and they are generally obtained in very good yield and in a pure state. It is of advantage first to isolate the chlorides obtained from the carboxylic acids. In some cases, however, the isolation of the acid chloride can be dispensed without harm, and the condensation carried out immediately following the preparation of the carboxylic acid chloride.

The invention also includes another method of making the new dyestuffs, wherein a diazo-compound of an amine of the formula (6) 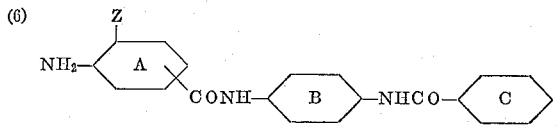

is coupled with a compound of the formula (7) 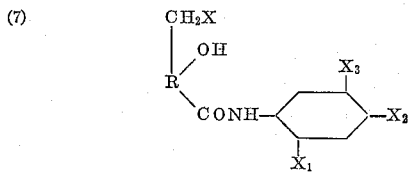

in which R in the above formulae represents a naphthalene radical in which the —CH$_2$X, hydroxyl and

—CONH— groups are in the 1-, 2- and 3-positions, respectively, A, B, C, X$_1$, X$_2$, X$_3$ and Z have the meanings given above, and X represents the radical of an amine, advantageously an amine of the formula

in which R$_1$ represents a hydrogen atom or an alkyl radical, and R$_2$ represents an alkyl radical, or in which the symbols R$_1$ and R$_2$ together with the nitrogen atom may form a heterocyclic ring. As examples of such radicals there may be mentioned the radicals of methylamine, dimethylamine, diethylamine, diethanolamine, pyrrolidine, piperidine and morpholine. The compounds of the Formula 7 can be obtained by reacting a compound of the formula (8) 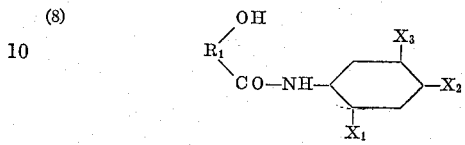

with formaldehyde and a primary or secondary amine.

During the coupling the radical —CH$_2$X is split off and the azo group takes its place. The coupling is advantageously carried out in an acid medium.

The azo-dyestuffs of this invention are valuable pigments which, owing to their insolubility in organic solvents and their resistance to heat, are especially useful for coloring plastic masses. They are distinguished by their excellent fastness to light and migration and the purity of the tints they produce. The dyestuffs of the invention can also be used for pigment printing, that is to say, a printing process in which a pigment is fixed on a substratum, especially on a textile material, or other sheet-like material, such as paper (for example, wallpaper) or fabrics of glass fibers, by means of a suitable adhesive, such as casein, a hardenable synthetic resin, especially a urea-formaldehyde or melamine-formaldehyde condensation product, solutions or emulsions of polyvinyl chloride or polyvinyl acetate or other emulsions, for example, oil-in-water or water-in-oil emulsions. The pigments of the invention can also be used, for example, in a finely divided form for spin-dyeing artificial silk or viscose or cellulose ethers or esters or polyamides or polyurethanes, and also for the production of colored lacquers or lacquer formers, solutions or products of acetyl-cellulose, nitrocellulose, natural or synthetic resins, such as polymerization or condensation resins, for example, aminoplasts, phenoplasts, polystyrene, polyethylene, polypropylene, polyacrylates, gums, casein, silicone or silicone resins. Furthermore, they can be used with advantage in the production of colored pencils, cosmetic preparations or laminated sheet material.

Preparations which contain the pigments in a finely divided form can be obtained in known manner by intense mechanical treatment, for example, on a roller mill or in a suitable kneading apparatus. The dispersing medium in which the intense mechanical treatment is carried out can be chosen with regard to the preparation to be made, for example, it may be sulfite cellulose waste liquor or a salt of dinaphthyl-methane disulfonic acid for making preparations that are to be dispersible in aqueous media, or acetyl-cellulose with a small amount of solvent may be used in the preparation of compositions for spinning cellulose acetate artificial silk.

By virtue of the especially advantageous physical form in which the products of the invention are generally obtained, and owing to their chemical inertness and good resistance to heat, they can easily be dispersed in the normal manner in masses or preparations of the kind described above, and they may be incorporated therein advantageously at a stage before the masses or preparations have reached their final form. The operations necessary for shaping, such as spinning, pressing, hardening, casting, stricking or the like, can easily be carried out in the presence of the pigments of this invention, without their reacting with the substratum or interfering with further polymerization, condensation or the like.

The following examples illustrate the invention, the parts and percentages being by weight unless otherwise stated, and the relationship of parts by weight to parts by volume being the same as that of the kilogram to the liter:

Example 1

29.9 parts of the dyestuff obtained by coupling diazotized 3-amino-4-phenoxy-benzene-1-carboxylic acid with 1-(2':3'-hydroxynaphthoylamino) - 2:5 - dimethoxy - 4-chlorobenzene, are heated in a bath at 135 to 145° C. with 600 parts by volume of chlorobenzene and 7.1 parts by volume of thionyl chloride. After 15 minutes a further 7.1 parts by volume of thionyl chloride is added, and the whole is maintained at that temperature for 15 minutes, during which the dyestuff completely dissolves. Upon cooling the carboxylic acid chloride crystallizes out in the form of red needles. The latter are filtered off and dried in vacuo at 40 to 50° C. The yield is 25.5 parts, which corresponds to 83% of the theoretical yield.

5.05 parts of the above chloride are heated with 2.20 parts of 4-(4'-chlorobenzoylamino)-1-amino-benzene and 0.7 part by volume of pyridine in 250 parts by volume of chlorobenzene for 6 hours in a bath at 130 to 140° C. The pigment so formed is filtered off while hot, washed with hot chlorobenzene, ethanol and water, and dried. There are obtained 6.5 parts (96% of the theoretical yield) of a red soft-grained powder which is very sparingly soluble in organic solvents, and when rolled into polyvinyl chloride foils colors them yellow-red tints. The color is very fast to light and migration.

In the following table are given further pigment dyestuffs which can be obtained in the manner described above and also possess very good properties of fastness. In column I are given the dazo-components, in column II the coupling components, in column III the condensation bases, and in column IV are given the tints of polyvinyl chloride foils colored with the pigments.

dissolved by the addition of a concentrated aqueous solution of caustic soda, and, after clarifying the solution by filtration, adjusting it to a pH-value of 10 with acetic acid. The solution is cooled to 15° C., and then there are run in 34.3 parts of diazotized 3-amino-4-chlorobenzene-1-carboxylic acid. When the coupling is complete, the whole is heated, rendered acid with hydrochloric acid, filtered, and the filter residue is washed until free from acid. There are obtained 101.5 parts of a dark red acid.

52.4 parts of this acid are heated with 650 parts of ortho-dichlorobenzene and 2 parts of dimethylformamide to 100° C. There are then slowly added 24 parts of thionyl chloride, and the whole is maintained for 2 hours at 100 to 110° C. The reaction mixture is allowed to cool, the crystals of the acid chloride which separate are filtered off, and washed with dichlorobenzene, benzene and petroleum ether, and dried in vacuo at 40 to 50° C. The yield amounts to 50.3 parts of the acid chloride.

5.58 parts of the acid chloride are heated with 2.9 parts of 2-chloro-4-benzoylamino-5-methoxy-1-aminobenzene in 325 parts of ortho-dichlorobenzene for 14 hours at 140 to 145° C. The whole is allowed to cool, and the pigment is washed with hot dichlorobenzene, methanol and water. By drying the product there are obtained 7.55 parts of an orange dyestuff.

In order to accelerate the condensation of the acid chloride with the corresponding base 0.5 to 1 part of pyridine may be added.

In the following table are given further pigment dyestuffs which can be obtained in the manner described above and also possess very good fastness properties.

| No. | I | II | III | IV |
|---|---|---|---|---|
| 1 | 3-amino-4-phenoxy-benzene-1-carboxylic acid. | 1-(2':3'-hydroxynaphthoylamino) 2:4-dimethoxy-5-chlorobenzene. | 4-(4'-chlorobenzoylamino)-1-aminobenzene. | yellow-red. |
| 2 | do | do | 4-benzoylamino-1-aminobenzene. | Do. |
| 3 | do | 1-(2':3'-hydroxynaphthoylamino)-2:5-dimethoxy-4-chlorobenzene. | do | Do. |
| 4 | do | do | 2-methoxy-4-benzoylamino-5-methyl-1-aminobenzene. | scarlet. |
| 5 | do | 1-(2':3'-hydroxynaphthoylamino)-2-methoxy-4-chloro-5-methylbenzene. | 4-benzoylamino-1-aminobenzene. | red-orange. |
| 6 | do | do | 4-(4'-chlorobenzoylamino)-1-aminobenzene. | Do. |
| 7 | 3-amino-4-(4'-chlorophenoxy)-benzene-1-carboxylic acid. | do | 4-benzoylamino-1-aminobenzene. | Do. |
| 8 | do | do | 4-(4'chlorobenzoylamino)-1-aminobenzene. | Do. |
| 9 | do | 1-(2':3'-hydroxynaphthoylamino)-2:5-dimethoxy-4-chlorobenzene. | 2-methoxy-4-benzoylamino-5-methyl-1-aminobenzene. | scarlet. |
| 10 | do | do | 4-(4'-chlorobenzoylamino)-1-aminobenzene. | yellow-red. |
| 11 | do | do | 4-benzoylamino-1-aminobenzene. | Do. |
| 12 | 3-amino-4-methoxybenzene-1-carboxylic acid. | do | 2:5-dimethoxy-4-benzoylamino-1-aminobenzene. | blue-red. |
| 13 | do | do | 4-(4'-chlorobenzoylamino)-1-aminobenzene. | scarlet. |
| 14 | do | do | 2:5-dimethoxy-4-(4'-chlorobenzoylamino)-1-aminobenzene. | blue-red. |
| 15 | do | 1-(2':3'-hydroxynaphthoylamino)-2-methoxy-4-chloro-5-methylbenzene. | 2-methoxy-4-benzoylamino-5-methyl-1-aminobenzene. | Do. |

Example 2

69.9 parts of 1-(2':3'-hydroxynaphthoylamino)-2:5-dimethoxy-4-chlorobenzene are suspended in alcohol and In column I are given the diazo-components, in column II the coupling components, in column III the condensation base and in column IV the tints of polyvinyl chloride foils colored with the pigment.

| No. | I | II | III | IV |
|---|---|---|---|---|
| 1 | 3-amino-4-chlorobenzene-1-carboxylic acid. | 1-(2':3'-hydroxynaphthoylamino)-2:5-dimethoxy-4-chlorobenzene. | 2-chloro-4-benzoylamino-5-methoxy-1-aminobenzene. | orange. |
| 2 | ___do___ | ___do___ | 2:5-dichloro-4-(4'-chlorobenzoylamino)-1-aminobenzene. | red. |
| 3 | ___do___ | ___do___ | 2:5-dichloro-4-benzoylamino-1-aminobenzene. | Do. |
| 4 | ___do___ | ___do___ | 2-methoxy-4-benzoylamino-5-chloro-1-aminobenzene. | Do. |
| 5 | ___do___ | ___do___ | 2:5-dimethyl-4-(4'-chlorobenzoylamino)-1-aminobenzene. | Do. |
| 6 | 3-nitro-4-aminobenzene-1-carboxylic acid. | 1-(2':3'-hydroxynaphthoylamino)-benzene. | 2:5-dimethyl-4-benzoylamino-1-aminobenzene. | orange. |
| 7 | ___do___ | ___do___ | 2:5-dichloro-4-benzoylamino-1-aminobenzene. | Do. |
| 8 | 3-amino-4-fluorobenzene-1-carboxylic acid. | ___do___ | 2:5-dichloro-4-(4'-chlorobenzoylamino)-1-aminobenzene. | scarlet. |
| 9 | ___do___ | ___do___ | 2:5-dimethyl-4-benzoylamino-1-aminobenzene. | Do. |
| 10 | ___do___ | ___do___ | 2:5-dichloro-4-benzoylamino-1-aminobenzene. | Do. |
| 11 | 3-amino-4-methylbenzene-1-carboxylic acid. | ___do___ | ___do___ | Do. |
| 12 | ___do___ | ___do___ | 2:5-dichloro-4-(4'-chlorobenzoylamino)-1-aminobenzene. | Do. |
| 13 | ___do___ | ___do___ | 2:5-dimethyl-4-benzoylamino-1-aminobenzene. | Do. |
| 14 | ___do___ | ___do___ | 2-methoxy-4-benzoylamino-5-chloro-1-aminobenzene. | Do. |
| 15 | 3-amino-4-chlorobenzene-1-carboxylic acid. | 1-(6'-bromo-2':3'-hydroxynaphthoylamino)-2:5-dimethoxy-4-chlorobenzene. | 2:5-dichloro-4-benzoylamino-1-aminobenzene. | red. |

Example 3

15.6 parts of 1:4-dimethyl-2-benzoylamino-5-(4'-methoxy-3'-amino)-benzoylaminobenzene are suspended in 100 parts of glacial acetic acid, 10 parts of hydrochloric acid of 30% strength are added and diazotization is carried out at 0 to 5° C. with 11 parts of 4 N-solution of sodium nitrite. After 15 minutes, the whole is diluted with 150 parts of ice water, filtered, and then the clear diazo-solution is run at 0 to 10° C. into a solution of 14.8 parts of 1-dimethylaminomethyl-2-hydroxy-3-naphthoic acid-(4'-chloro-2':5'-dimethoxy)-phenylamide in 500 parts of water and 19 parts of 2 N-hydrochloric acid. The whole is adjusted to a pH-value of 4.5 to 5 with a solution of sodium acetate, and stirred for 12 hours at 5 to 15° C. The mixture is filtered with suction, and the filter residue is washed with water and suspended in 120 parts of 5 N-hydrochloric acid, the whole is stirred for one hour at room temperature, filtered, and the filter residue is washed with dilute hydrochloric acid and water. The pigment is treated for 2 hours in a boiling water bath with 300 parts of pyridine, the mixture is filtered while hot, and the filter residue is washed with pyridine, ethanol and water, and dried. There are obtained 25.2 parts (93.6% of the theoretical yield) of a red, soft-grained powder, which is very sparingly soluble in organic solvents, and when incorporated by rolling in polyvinyl chloride foils yields bright red colorations. The color is very fast to migration and has a good fastness to light.

The product so obtained has the formula

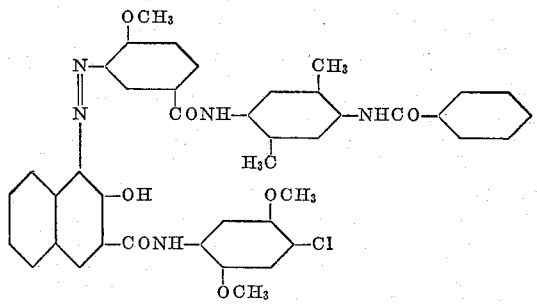

Example 4

65 parts of polyvinyl chloride, 35 parts of dioctyl phthalate, and 0.2 part of the dyestuff obtained as described in Example 1 are stirred together, and then rolled on a 2-roller calender for 7 minutes at 140° C. There is obtained a scarlet red foil of very good fastness to light and migration.

What is claimed is:

1. Azo-dyestuffs of the formula

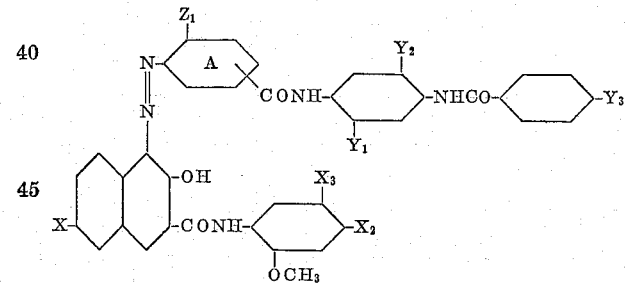

in which $Z_1$ represents a member selected from the group consisting of chlorine, fluorine, lower alkyl, lower alkoxy, phenoxy and nitro groups, X represents a member selected from the group consisting of hydrogen and bromine, $X_2$ represents a member selected from the group consisting of chlorine and lower alkoxy, $X_3$ represents a member selected from the group consisting of chlorine, lower alkyl and alkoxy, $Y_1$ and $Y_2$ represent members selected from the group consisting of hydrogen, chlorine, lower alkyl and alkoxy and $Y_3$ represents a member selected from the group consisting of hydrogen and chlorine, and which formula the —CONH— group in the ring A is at least 3 carbons from the azo group.

2. The compound of the formula

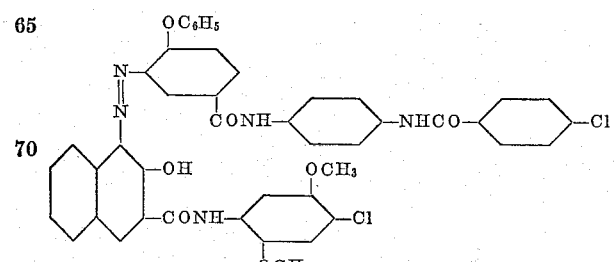

3. The compound of the formula
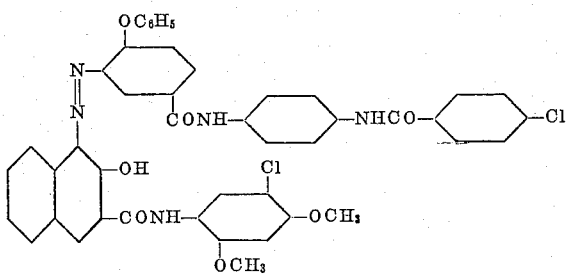
4. The compound of the formula
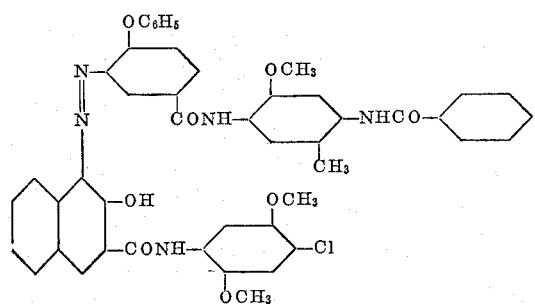
5. The compound of the formula
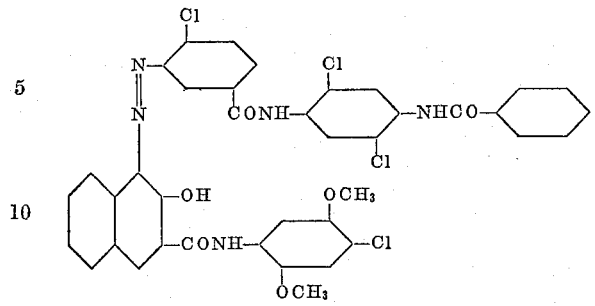
6. The compound of the formula
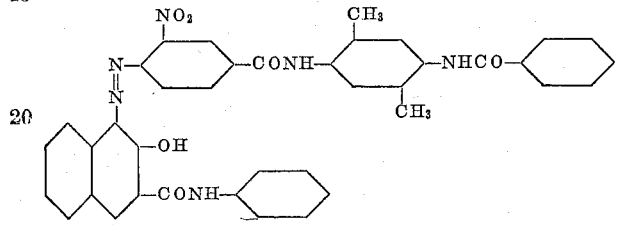
References Cited in the file of this patent
UNITED STATES PATENTS
2,210,072    Fischer _____ Aug. 6, 1940
2,267,770    Von Glahn _____ Dec. 30, 1941